(12) United States Patent
Assem et al.

(10) Patent No.: US 9,571,163 B1
(45) Date of Patent: Feb. 14, 2017

(54) METHODS AND APPARATUS FOR DETERMINING NEARFIELD LOCALIZATION USING PHASE AND RSSI DIVERSITY

(71) Applicant: TEXAS INSTRUMENTS INCORPORATED, Dallas, TX (US)

(72) Inventors: Pourya Assem, Northbrook, IL (US); Hun Seok Kim, Ann Arbor, MI (US); Jing-Fei Ren, Plano, TX (US); Srinath Mathur Ramaswamy, Murphy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/927,747

(22) Filed: Oct. 30, 2015

(51) Int. Cl.
*H04B 7/24* (2006.01)
*H04B 5/00* (2006.01)
*H04B 17/318* (2015.01)
*H04W 4/02* (2009.01)

(52) U.S. Cl.
CPC .......... *H04B 5/0043* (2013.01); *H04B 17/318* (2015.01); *H04W 4/023* (2013.01)

(58) Field of Classification Search
CPC ..... H04B 5/0043; H04B 17/318; H04W 4/023
USPC ......... 455/39, 41.1, 41.2, 67.16, 115.3, 134; 342/118, 127
See application file for complete search history.

(56) References Cited

U.S. PATENT DOCUMENTS

2006/0267833 A1* 11/2006 Langford .............. G01S 5/0252
342/174

OTHER PUBLICATIONS

Hans G. Schantz, "Near field phase behavior," 2005 IEEE Antennas and Propagation Society International Symposium, Jul. 3, 2005, Washington D.C., 5 pages.

* cited by examiner

*Primary Examiner* — Tuan Pham
(74) *Attorney, Agent, or Firm* — John R. Pessetto; Charles A. Brill; Frank D. Cimino

(57) ABSTRACT

Methods and apparatus to determine nearfield localization using phase and received signal strength indication (RSSI) diversity are disclosed. An example method includes determining a first strength of an electric field and a second strength of a magnetic field, the electric field and the magnetic field associated with an electromagnetic signal sent from a transmitter; determining a difference between the first strength and the second strength; and determining a transmitter distance based on the difference between the first strength and the second strength.

3 Claims, 5 Drawing Sheets

METHODS AND APPARATUS FOR DETERMINING NEARFIELD LOCALIZATION USING PHASE AND RSSI DIVERSITY

FIELD OF THE DISCLOSURE

This disclosure relates generally to nearfield localization and, more particularly, to methods and apparatus for determining nearfield localization using phase and received signal strength indication (RSSI) diversity.

BACKGROUND

Nearfield electromagnetic ranging uses transmitters (e.g., RFID tags, NFC tags, bluetooth, etc.) to transmit electromagnetic signals to receivers. The receivers can determine information from a received signal, including data related to the signal and data embedded in the signal. The information may be used to determine a distance between the transmitter and the receiver. Accuracy of the determined distance is largely based on the actual distance between the transmitter and the receiver. Determining distances associated with Short distances (e.g., less than 2 meters) is much less accurate than determining distances associated with long distances (e.g., more than 10 meters). Determining distances between the transmitter and the receiver, especially at short distances, with greater accuracy is desirable.

SUMMARY

Examples disclosed herein determine how far an electromagnetic transmitter is away from a receiver. An example apparatus disclosed herein includes a received signal strength indication (RSSI) determiner to determine a first strength of an electric field and a second strength of a magnetic field, the electric field and the magnetic field associated with an electromagnetic signal sent from a transmitter. Such examples include an RSSI difference determiner to determine a difference between the first strength and the second strength. Such examples include a weight applier to determine a transmitter distance based on the difference between the first strength and the second strength.

DETAILED DESCRIPTION

Figure 1:
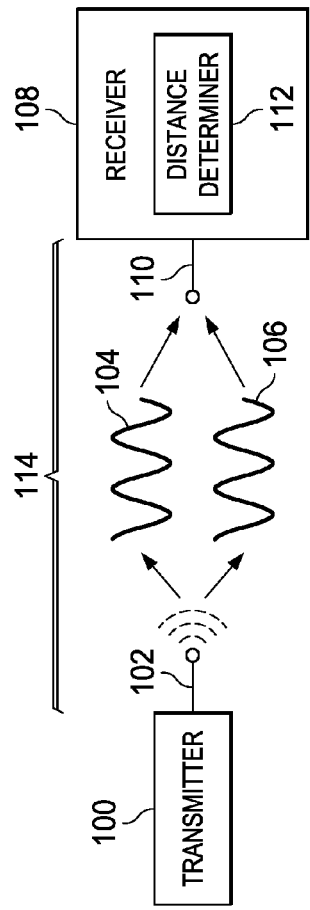
FIG. 1 is an example illustration of communications between an example transmitter and an example receiver.

Transmitters and receivers communicate data (e.g., instructions, signals, audio, video, images, etc.) wirelessly via electromagnetic (e.g., radio) signals (e.g., waves). An electromagnetic signal creates an electric field and a magnetic field. Properties of the electric field and the magnetic field may be analyzed to determine how far away a receiver is from a transmitter (e.g., electromagnetic localization). Accurately determining distances between transmitters and receivers has a wide variety of advantages. For example, accurately determining transmitter distances may create customized experiences for mobile phone users. For example, if a receiver determines that a cell phone (e.g., a transmitter) is very close to a receiver placed in a particular store, the receiver may send the cell phone an advertisement or coupon. Additionally, accurate localization may, for example, instruct a device in communication with a receiver in a car to unlock the trunk of the car when a key including a transmitter approaches the trunk.

Conventional techniques for determining a distance between a receiver and a transmitter include determining a phase angle difference between an electric field and a magnetic field associated with an electromagnetic signal. In such conventional techniques, an antenna associated with a receiver receives the electromagnetic signal from a transmitter. For longer distances (e.g., more than 2 meters (m)) the difference between the two phase angles accurately correlates to the distance between the transmitter and the receiver. However, at shorter distances (e.g., less than 2 m), the correlation between the difference associated with the phase angles and the distance between the transmitter and the receiver becomes much less accurate. Therefore, the difference between the phase angle of the electric field and the magnetic field is not a good indicator of the distance between the transmitter and the receiver at short distances.

Examples disclosed herein include determining a distance between a receiver and a transmitter based on a received signal strength indication (RSSI) value (e.g., calculated in decibels per milliwatt (dBm)) of an electric field, an RSSI value of a magnetic field, an RSSI difference between the electric field and the magnetic field, and a phase angle difference between the electric field and the magnetic field associated with a received electromagnetic signal. RSSI and phase angle characteristics of an electric field and/or a magnetic field are results of Maxwell's equations as shown below:

$$RSSI_{like} \propto \left( \frac{1}{(kr)^2} - \frac{1}{(kr)^4} + \frac{1}{(kr)^6} \right)$$

$$RSSI_{unlike} \propto \left( \frac{1}{(kr)^2} + \frac{1}{(kr)^4} \right)$$

$$\text{Electric\_Phase} \propto \angle\left(\left( \frac{1}{(kr)^2} + \frac{1}{(kr)^4} - \frac{1}{(kr)^6} \right) e^{-jkr}\right)$$

$$\text{Magnetic\_Phase} \propto \angle\left(\left( \frac{1}{(kr)^2} + \frac{1}{(kr)^4} \right) e^{-jkr}\right)$$

Where k is a wavenumber (e.g., associated with a frequency) and r is the distance between the receiver and the transmitter. In these equations, $RSSI_{like}$ refers to the RSSI value associated with a type of field associated with a type of antenna receiving the electromagnetic signal. For example, if an antenna associated with a receiver is an electric field antenna, then the $RSSI_{like}$ value is associated with the electric field and the $RSSI_{unlike}$ is associated with the magnetic field. Alternatively, if the antenna associated with the receiver is a magnetic field antenna, then the RSSI value of the electric field is the $RSSI_{unlike}$ and the RSSI value of the magnetic field is the $RSSI_{like}$.

Examples disclosed herein calculate the RSSI difference between the electric RSSI value and the magnetic RSSI value of a received electromagnetic signal. The RSSI difference may be calculated by subtracting the $RSSI_{like}$ value by the $RSSI_{unlike}$ value. For example, $$\Delta RSSI_{dB}(k, r) = a_{like}\left(\frac{1}{(kr)^2} - \frac{1}{(kr)^4} + \frac{1}{(kr)^6}\right) - a_{unlike}\left(\frac{1}{(kr)^2} + \frac{1}{(kr)^4}\right) + a_{offset}.$$

where $a_{like}$ and $a_{unlike}$ are scaling terms for the $RSSI_{like}$ and the $RSSI_{unlike}$. The scaling terms are specific to a signal path and link properties of the electric and/or magnetic field. Additionally, $a_{offset}$ may be used to tune the scaling terms to match a particular pattern (e.g., to optimize hardware implementation). Phase angle difference may be calculated in a similar manner. For example, $$\Delta Phase_{degree}(k, r) = \angle\left(\left(\frac{1}{(kr)^2} - \frac{1}{(kr)^4} + \frac{1}{(kr)^6}\right)e^{-jkr}\right) - \angle\left(\left(\frac{1}{(kr)^2} + \frac{1}{(kr)^4}\right)e^{-jkr}\right) + \phi_{offset}.$$

where $\phi_{offset}$ is a calibration factor specific to the signal path and/or the link properties of the electric field and/or the magnetic field.

Determining the distance between a receiver and a transmitter using an RSSI difference between an electric field and a magnetic field is advantageous because the RSSI difference is not dependent on transmission power. Transmission power of the electromagnetic signals may be unknown or change over time. For example, transmission power may be affected by a physical environment (e.g., obstacles altering the signal), a power level of the receiver and/or the transmitter, a type of receiver antenna and/or transmitter antenna, a proximity to other electromagnetic signals, weather, etc. In such examples, the electric RSSI value and magnetic RSSI value may be altered, but the difference between the electric RSSI value and magnetic RSSI value remains the same. Taking advantage of the RSSI difference allows the use of less complex and cheaper receivers that do not need additional hardware and/or software to account for changes in transmission power. Additionally, the RSSI difference is far more accurate and precise in determining short transmitter distances then the conventional phase angle difference.

Examples disclosed herein determine a transmitter distance between a receiver and a transmitter based on estimated distances stored in memory. The estimated distances are based on the characteristics of the electric field RSSI value, the magnetic field RSSI value, the RSSI difference between the electric field and the magnetic field, and the phase angle difference between the electric field and the magnetic field. Examples disclosed herein apply a set of weights for each of the estimated distances to determine the transmitter distance. For example, based on Maxwell's equations and/or measured samples, example disclosed herein may determine that the estimated distances for a received electromagnetic signal are 0.3 m (based on the electric RSSI value), 1.0 m (based on the magnetic RSSI value), 0.9 m (based on the difference RSSI value), and 0.2 m (based on the phase angle difference). In such examples, a weight applier determines a set of weights based on the estimated differences. For example, the set of weights may be 0.1, 0.1, 0.7, 0.1. In such examples, the transmitter distance is 0.8 m (e.g., (0.3 m)(0.1)+(0.1 m)(1)+(0.7 m)(0.9)+(0.2 m)(0.1)=0.8 m).

An example apparatus includes a received signal strength indication (RSSI) determiner to determine a first strength of an electric field and a second strength of a magnetic field, the electric field and the magnetic field associated with an electromagnetic signal sent from a transmitter. In such examples, an RSSI difference determiner determines a difference between the first strength and the second strength. In such examples, a weight applier determines a transmitter distance based on the difference between the first strength and the second strength.

The illustration of FIG. 1 includes an example transmitter 100, an example transmitter antenna 102, an example electric field 104, an example magnetic field 106, an example receiver 108, an example receiver antenna 110, an example distance determiner 112, and an example transmitter distance 114.

The example transmitter 100 is an electrical device that produces an electromagnetic signal (e.g., including the example electric field 104 and the example magnetic field 106) by generating a frequency alternating current (AC). The electromagnetic signal may include data (e.g., instructions, code, audio, video, images, etc.) to be transmitted to other devices. In some examples, the transmitter 100 may include a power supply (e.g., a battery, plug, etc.) to power the transmitter 100. In such examples, the transmitter 100 may transmit electromagnetic signal at all times or may only transmit electromagnetic signal based on some control (e.g., based on a timer, a control signal, a button, etc.). Alternatively, the example transmitter 100 may include an antenna (e.g., such as the example transmitter antenna 102 and/or an additional antenna) or coil to receive power from an external electromagnetic signal produced by an external device (e.g., the example receiver 109 and/or an additional device). In such examples, the coil and/or the antenna is excited by the external electromagnetic signal, which powers the example transmitter 100. The example transmitter 100 of the example illustration is an RFID transmitter producing a 13.56 Megahertz (MHz) radio wave (e.g., electromagnetic signal). Alternatively, the example transmitter 100 may be an NFC transmitter, a mobile device, a computing device, a portable device, a bluetooth device, and/or any other device capable of producing electromagnetic signals at any frequency.

The example transmitter 100 includes the example transmitter antenna 102. The example transmitter antenna 102 is a conductor to output the electromagnetic signals produced by the example transmitter 100. The AC current generated by the example transmitter 100 excites the example antenna 102 to transmit the electromagnetic signals at a set frequency. The example transmitter antenna 102 may be an electric antenna, a magnetic antenna, a linear antenna, a loop antenna, an aperture antenna, an array antenna, and/or any other type of antenna. The example transmitter antenna 102 may be enclosed within the transmitter 100 or may be attached externally to the transmitter 100. In some examples, the dimensions of the example transmitter antenna 102 determine the frequency and/or wavelength of the transmitted electromagnetic signals. In the illustrated example, the transmitter antenna 102 radiates the example electric field 104 and the example magnetic field 106. In some examples, the transmitter antenna 102 may also receive electromagnetic signals. In such examples, the transmitter antenna 102 may receive data from an external device and/or power the example transmitter 100.

The example receiver 108 is an electrical device that receives electromagnetic signals from the example transmitter antenna 102 of the example transmitter 100. If the electromagnetic signals include data, the example receiver 108 determines the data from the electromagnetic signals. In some examples, the receiver 108 may also transmit additional electromagnetic signals. In such examples, the receiver 108 may transmit the additional electromagnetic signals to the example transmitter 100 to send data and/or power the example transmitter 100. The example transmitter 100 may be an RFID reader, an NFC reader, a mobile device, a computing device, a portable device, a bluetooth device, and/or any other device capable of receiving electromagnetic signals.

The example receiver 108 includes a receiver antenna 110. The example receiver antenna 110 intercepts electromagnetic signals transmitted by the transmitter antenna 102. The example transmitter antenna 102 may be an electric antenna, a magnetic antenna, a linear antenna, a loop antenna, an aperture antenna, an array antenna, and/or any other type of antenna. The intercepted electromagnetic signals are converter into AC to extract desired information from the electromagnetic signals. In some examples, the example receiver antenna 110 is structured to only receive electromagnetic signals at one frequency. In some examples, the example receiver antenna 110 is structured to receive electromagnetic signals at various frequencies. The example receiver antenna 110 may be enclosed within the example receiver 108 or may be attached externally to the receiver 108. In some examples, the receiver antenna 110 also transmits electromagnetic signals to the example transmitter 100. In some examples, the receiver antenna 110 includes two antennas (e.g., one to receive the electric field 104 and one to receive the magnetic field 106).

The example receiver 108 includes the distance determiner 112. The distance determiner 112 determines the example transmitter distance 114 (e.g., the distance between the transmitter 100 and the receiver 108). The distance determiner 112 calculates various metrics (e.g., including metrics related to phase angle and RSSI values) based on the electric field 104 and magnetic field 106 received by the receiver antenna 110. In some examples, the metrics create weights based on various factors to determine and report the example transmitter distance 114 between the transmitter 100 and the distance determiner 112, as further described in FIG. 2.

In operation, the example transmitter 100 produces an electromagnetic signal. As previously described, the example transmitter 100 may produce the electromagnetic signal whenever powered and/or based on a control signal. In some examples, the control signal may be transmitted by the example receiver 108 to the example transmitter 100. The example transmitter antenna 102 transmits the electromagnetic signal, producing the example electric field 104 and the example magnetic field 106, over the example transmitter distance 114. The example electric field 104 and the example magnetic field 106 are received by the example receiver 108 through the example receiving antenna 110.

The example distance determiner 112 determines and reports the transmitter distance 114 between the example transmitter 100 and the example receiver 108.

Figure 2:
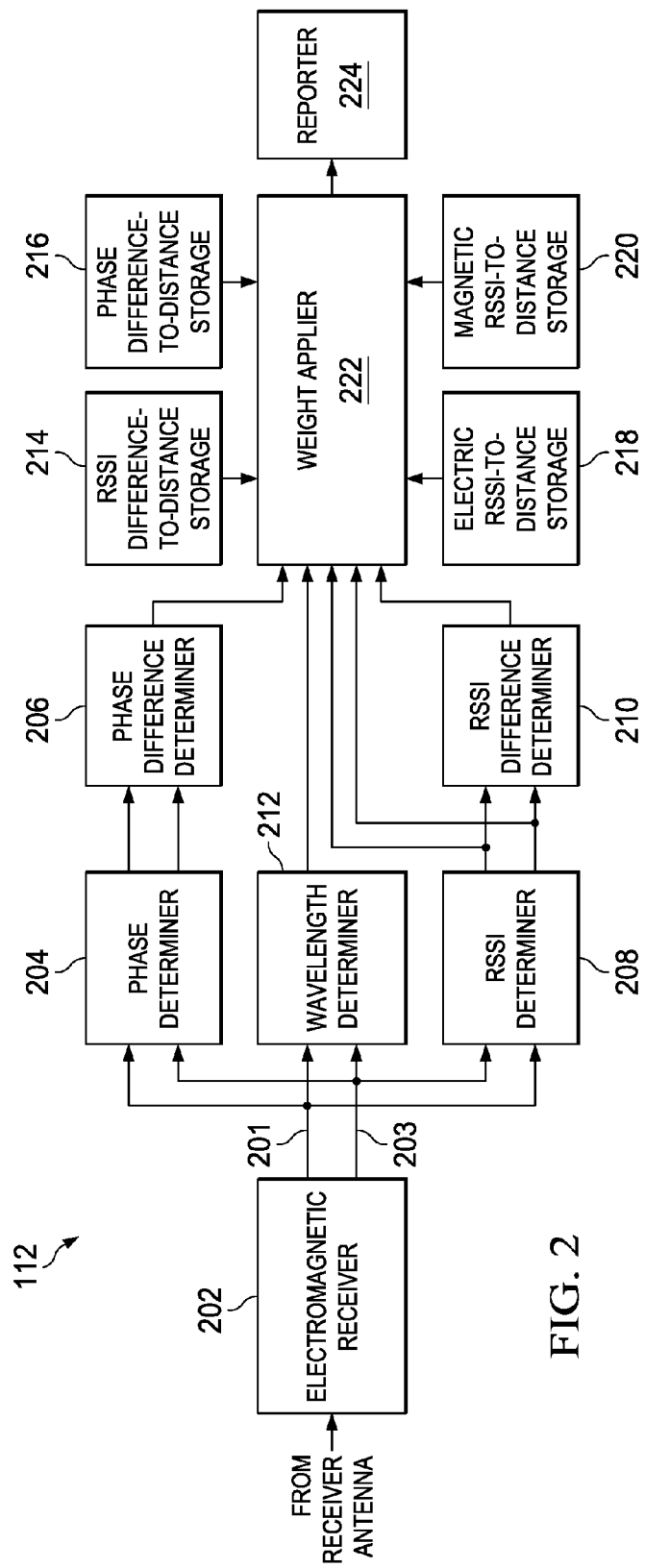
FIG. 2 is an example block diagram of an example distance determiner of FIG. 1.

FIG. 2 is a block diagram of an example implementation of the distance determiner 112 of FIG. 1, disclosed herein, to determine the example transmitter distance 114 between the example transmitter 102 and the example receiver 108. While the example distance determiner 112 of FIG. 1 is described in conjunction with the example transmitter 100 and the example receiver 108, the example distance determiner 112 may be utilized to determine a distance from any device producing and/or receiving an electromagnetic signal.

The example distance determiner 112 includes an example electric field signal 201, an example electromagnetic receiver 202, an example magnetic field signal 203, an example phase determiner 204, an example phase difference determiner 206, an example RSSI determiner 208, an example RSSI difference determiner 210, an example wavelength determiner 212, an example RSSI difference-to-distance storage 214, an example phase different-to-distance storage 216, an example electric RSSI-to-distance storage 218, an example magnetic RSSI-to-distance storage 220, an example weight applier 222, and an example reporter 224.

When an electromagnetic signal (e.g., wave) is received by the example receiver antenna 110, the electromagnetic signal is transmitted to the example electromagnetic receiver 202. The electromagnetic receiver 202 may receive the electromagnetic signal through a wired or wireless connection. The example electromagnetic receiver 202 breaks the electromagnetic signal into the example electric field signal 201 and the example magnetic field signal 203. Data related to the electric field signal 201 and the magnetic field signal 203 are used to determine the transmitter distance 114 between the example transmitter 100 and the example receiver 108 based on a phase angle and/or an RSSI value associated with the electric field signal 201 and/or the magnetic field signal 203.

The example phase determiner 204 determines a phase angle of the example electric field signal 201 and the example magnetic field signal 203. At a large transmitter distance 114 (e.g., more than 1.5 meters), the phase angles of the example electric field signal 201 and the example magnetic field signal 203 are in sync. As the transmitter distance 114 shortens, the phase angles of the example electric field signal 201 and the example magnetic field signal 203 begin to diverge. At a small transmitter distance 114 (e.g., less than 1.5 meters), the phase angles of the electric field signal 201 and the magnetic field signal 203 are 90 degrees out of phase, as further described in FIG. 5.

The example phase difference determiner 206 calculates a difference between the phase angle associated with the electric field signal 201 and the phase angle associated with the magnetic field signal 203. In some examples, the phase difference determiner 206 calculates the phase angle difference by subtracting the determined phase angle of the electric field signal 201 with the determined phase angle of the magnetic field signal 203. In some examples, the phase difference determiner 206 calculates the phase angle difference by subtracting the determined phase angle of the magnetic field signal 203 with the determined phase angle of the electric field 108. The calculation of the difference may be implemented using hardware, software, and/or firmware.

The example RSSI determiner 208 determines an RSSI value (e.g., in dBm) for the example electric field signal 201 and the example magnetic field signal 203. At a small transmitter distance 114 (e.g., less than 2 meters). At a large transmitter distance 114 (e.g., more than 2 meters), the RSSI value of the example electric field signal 201 and the example magnetic field signal 203 are similar. As the transmitter distance 114 shortens (e.g., to less than 2 meters), the RSSI values of the example electric field signal 201 and the example magnetic field signal 203 begin to diverge at a linear rate, as further described in FIG. 6.

The example RSSI difference determiner 210 calculates a difference between the RSSI value associated with the electric field signal 201 and the RSSI value associated with the magnetic field signal 203. In some examples, the RSSI difference determiner 210 calculates the RSSI value difference by subtracting the determined RSSI value of the electric field signal 201 with the determined RSSI value of the magnetic field signal 203. In some examples, the RSSI difference determiner 210 calculates the RSSI value difference by subtracting the determined RSSI value of the magnetic field signal 203 with the determined RSSI value of the electric field 108. The calculation of the difference may be implemented using hardware, software, and/or firmware.

The example wavelength determiner 212 determines the wavelength (e.g., wavelength=speed of light/frequency) of the received electric field signal 201 and/or the received magnetic field signal 203. The electric field signal 201 and the magnetic field signal 203 have the same wavelength; however, there may be instances where the wavelength of the electric field signal 201 and/or the magnetic field signal 203 may be hard to determine. In some examples, the wavelength determiner 212 determines the wavelength of both the electric field signal 201 and the magnetic field signal 203 to verify that the wavelengths are the same. In some examples, the wavelength determiner 212 determines the wavelength of one of the electric field signal 201 or the magnetic field signal 203 and calculates the wavelength of the other field if an error has occurred. In some examples, the wavelength may be included in data from the electromagnetic signal. In such examples, the wavelength determiner 212 determines the wavelength based on the data. In some examples, the example receiver 108 is structured to only receive electromagnetic signals at one wavelength. In such examples, the wavelength determiner 212 may not be required to determine the wavelength (e.g., since only one wavelength can be received). In some examples, the wavelength determines 212 may determine a frequency of the electric field signal 201 and/or magnetic field signal 203 instead of and/or in addition to the wavelength.

The example RSSI difference-to-distance storage 214 includes an RSSI look-up-table (LUT) of RSSI difference values with corresponding distances. As previously described, the RSSI difference between the electric field signal 201 and the magnetic field signal 203 corresponds to the example transmitter distance 114. The RSSI LUT associates various RSSI difference values with various locations based on Maxwell's equations and/or previously tested RSSI difference values at set distances. For example, an RSSI difference LUT may include data relating a 10 dBm RSSI difference to a distance of 10 centimeters (cm), a 4 dBm RSSI difference to a distance of 1 meter, etc. In some examples, the RSSI difference-to-distance storage 214 includes various look-up-tables (LUTs) for various wavelengths and/or frequencies. For example, the RSSI difference-to-distance storage 214 may include an RSSI difference LUT for a 13.56 MHz signal, an RSSI difference LUT for a 2.4-2.5 Gigahertz (GHz) signal, etc.

The example phase difference-to-distance storage 216 includes a phase angle LUT of phase angle differences with corresponding distances. As previously described, the phase angle difference between the electric field signal 201 and the magnetic field signal 203 corresponds to the example transmitter distance 114. The phase angle difference LUT associates various phase angle differences with various locations based on Maxwell's equations and/or previously tested phase angle differences at set distances. For example, a phase angle difference LUT may include data relating a phase angle difference of 80 degrees to a distance of 2 m, a phase angle difference of 20 degrees to a distance of 5 m, etc. In some examples, the phase difference-to-distance storage 216 includes various LUTs for various wavelengths and/or frequencies. For example, the phase difference-to-distance storage 216 may include a phase angle difference LUT for a 13.56 MHz signal, a phase angle difference LUT for a 2.4-2.5 GHz signal, etc.

The example electric RSSI-to-distance storage 218 includes an electric RSSI LUT of electric RSSI values with corresponding distances. As previously described, the electric RSSI value corresponds to the example transmitter distance 114. The electric RSSI LUT associates various electric RSSI values with various locations based on Maxwell's equations and/or previously tested electric RSSI values at set distances. For example, an electric RSSI LUT may include data relating an electric RSSI of 3 dBm to a distance of 10 cm, an electric RSSI of −17 dBm to a distance of 1 meter, etc. In some examples, the electric RSSI-to-distance storage 218 includes various LUTs for various wavelengths and/or frequencies. For example, the electric RSSI-to-distance storage 218 may include an electric RSSI LUT for a 13.56 MHz signal, an electric RSSI LUT for a 2.4-2.5 GHz signal, etc.

The example magnetic RSSI-to-distance storage 220 includes a magnetic RSSI LUT of magnetic RSSI values with corresponding distances. As previously described, the magnetic RSSI value corresponds to the example transmitter distance 114. The magnetic RSSI LUT associates various magnetic RSSI values with various locations based on Maxwell's equations and/or previously tested magnetic RSSI values at set distances. For example, a magnetic RSSI LUT may include data relating a magnetic RSSI of −8 dBm to a distance of 10 cm, a magnetic RSSI of −21 dBm to a distance of 1 meter, etc. In some examples, the magnetic RSSI-to-distance storage 220 includes various LUTs for various wavelengths and/or frequencies. For example, the magnetic RSSI-to-distance storage 220 may include a magnetic RSSI LUT for a 13.56 MHz signal, a magnetic RSSI LUT for a 2.4-2.5 GHz signal, etc.

The example weight applier 222 receives the RSSI values of the electric field signal 201 and the magnetic field signal 203 from the example RSSI determiner 208, the phase angle difference from the example phase difference determiner 210, and the RSSI difference from the example RSSI difference determiner 212. Additionally, the example weight applier may receive additional information including transmission power of the received electromagnetic signal, user and/or manufacture settings, and/or determined wavelength and/or frequency of the received electromagnetic signal. The example weight applier 222 applies a set of weights for each of the RSSI difference, the electrical RSSI value, the magnetic RSSI value, and the phase difference to determine a distance, as shown below:

$$\text{Distance} = a_1(D_{\Delta RSSI}) + a_2(D_{\Delta phase}) + a_3(D_{elec\_RSSI}) + a_4(D_{mag\_RSSI}),$$

where $a_1$-$a_4$ are the weights, $D_{\Delta RSSI}$ is a stored distance estimate associated with a received RSSI difference based on a wavelength of a received signal, $D_{\Delta phase}$ is a stored distance estimate associated with a received phase angle difference based on the wavelength of the received signal, $D_{elec\_RSSI}$ is a stored distance estimate associated with a received electrical RSSI value based on the wavelength of the received signal, and $D_{mag\_RSSI}$ is a stored distance estimate associated with a received magnetic RSSI value based on the wavelength and/or frequency of the received signal.

The example weight applier 222 determines the example transmitter 114 distance based on the estimated distances (e.g., stored in the example RSSI difference-to-distance storage 214, the example phase difference-to-distance storage 216, the example electric RSSI-to-distance storage 218, and the example magnetic RSSI-to-distance storage 220) associated with the received RSSI difference, the received electrical RSSI value, the received magnetic RSSI value, and the received phase angle difference. In some examples, the determination of the transmitter distance 114 is further based on the wavelength and/or frequency of the received electromagnetic signal. Based on the distance estimates, the weight applier 222 determines whether the transmitter distance 114 is less than a threshold distance. For example, if the threshold distance is 2 meters, the weight applier 222 obtains the estimated distances based on data associated with the received electromagnetic signal from the storages 214-220 to determine if the received signal is less than 2 meters. If all of the distance estimates are below, or most of the distance estimates are below, 2 meters, the example weight applier 222 applies a first set of weights associated with a short distance. If all of the distance estimates are above, or most of the distance estimates above, 2 meters, the example weight applier 222 applies a second set of weight associated with a longer distance. In some examples, the weight applier 222 determines if the difference between the phase difference distance estimate and the RSSI difference distance estimate is larger than a threshold amount (e.g., 64%). In such examples, if the difference between the two distance estimates is more than the threshold amount, then a first set of weights is applied and if the distance between the two distances is less than the threshold amount, then a second set of weights is applied. The threshold distance, the first set of weights, and the second set of weights may be preset and/or adjusted based on user and/or manufacture settings.

The example reporter 224 reports the determined weights and/or the determined transmitter 114. In some examples, the reporter 224 generates a signal (e.g., a control signal) based on the transmitter distance 114. In such examples, the reporter 224 may transmit data including the weights and/or the determined transmitter distance 114 to an additional device. In some examples, the reporter 224 may transmit the determined transmitter 114 distance to a processor (e.g., connected to and/or in communication with the example receiver 108 and/or the example transmitter 100). The processor may perform an operation based on the determined transmitter distance 114. For example, if the example transmitter 100 is a cell phone and the example receiver 108 is located near the steering wheel of a vehicle, the reporter 224 may transmit a signal to the cell phone that the cell phone is within 30 centimeters of the steering wheel. In such examples, the cell phone may disable (e.g., lock) the cell phone. The transmission of the signal may be via a wired or wireless connection.

While example manners of implementing the example distance determiner 112 of FIG. 1 are illustrated in FIG. 2, elements, processes and/or devices illustrated in FIG. 2 may be combined, divided, re-arranged, omitted, eliminated and/or implemented in any other way. Further, the example electromagnetic receiver 202, the example phase determiner 204, the example phase difference determiner 206, the example RSSI determining 208, the example RSSI difference determiner 210, the example wavelength determiner 212, the example RSSI difference-to-distance storage 214, the example phase difference-to-distance storage 216, the example electric RSSI-to-distance storage 218, the example magnetic RSSI-to-distance storage 220, the example weight applier 222, the example reporter 224 and/or, more generally, the example distance determiner 112 of FIG. 2, may be implemented by hardware, machine readable instructions, software, firmware and/or any combination of hardware, machine readable instructions, software and/or firmware. Thus, for example, any of the example electromagnetic receiver 202, the example phase determiner 204, the example phase difference determiner 206, the example RSSI determining 208, the example RSSI difference determiner 210, the example wavelength determiner 212, the example RSSI difference-to-distance storage 214, the example phase difference-to-distance storage 216, the example electric RSSI-to-distance storage 218, the example magnetic RSSI-to-distance storage 220, the example weight applier 222, the example reporter 224 and/or, more generally, the example distance determiner 112 of FIG. 2, could be implemented by analog and/or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example electromagnetic receiver 202, the example phase determiner 204, the example phase difference determiner 206, the example RSSI determining 208, the example RSSI difference determiner 210, the example wavelength determiner 212, the example RSSI difference-to-distance storage 214, the example phase difference-to-distance storage 216, the example electric RSSI-to-distance storage 218, the example magnetic RSSI-to-distance storage 220, the example weight applier 222, the example reporter 224 and/or, more generally, the example distance determiner 112 of FIG. 2, is/are hereby expressly defined to include a tangible computer readable storage device or storage disk such as a memory, a digital versatile disk (DVD), a compact disk (CD), a Blu-ray disk, etc. storing the software and/or firmware. Further still, the example distance determiner 112 of FIG. 2 includes elements, processes and/or devices in addition to, or instead of, those illustrated in FIG. 3, and/or may include more than one of any or all of the illustrated elements, processes and devices.

Figure 3:
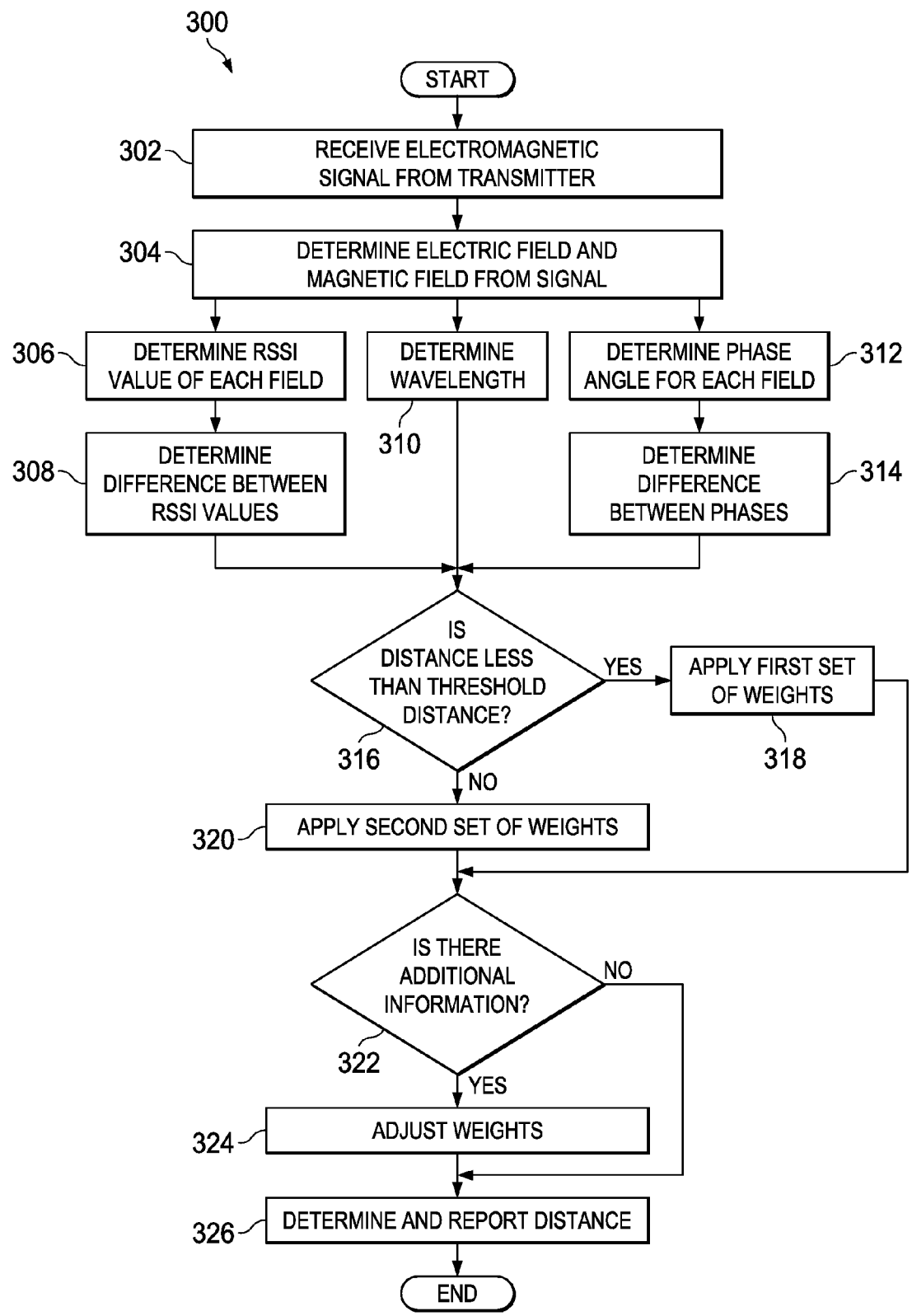
FIG. 3 is a flowchart representative of example machine readable instructions that may be executed to implement the example distance determiner of FIG. 2 to determine an example transmitter distance of FIG. 1.

A flowchart representative of example machine readable instructions for implementing the example distance determiner 112 of FIG. 2 is shown in FIG. 3. In the examples, the machine readable instructions comprise a program for execution by a processor such as the processor 712 shown in the example processor platform 1000 discussed below in connection with FIG. 7. The program may be embodied in machine readable instructions stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 3, many other methods of implementing the example distance determiner 112 of FIG.

2 may alternatively be used. For example, the order of execution of the blocks may be changed, and/or some of the blocks described may be changed, eliminated, or combined.

As mentioned above, the example processes of FIG. 3 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 3 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 3 is an example flowchart 300 representative of example machine readable instructions that may be executed to determine the example transmitter distance 114 between the example transmitter 100 and the example receiver 108. As previously described, the determination of the transmitter distance 114 is based on a set of weights which balance distance estimates associated with a magnetic RSSI value, an electric RSSI value, an RSSI difference value, and a phase angle difference value. The set of weights is one which optimizes localization by weighting the four metrics based on an estimated distance and/or other information based on the received electromagnetic signal.

At block 302, the electromagnetic receiver 202 receives an electromagnetic signal. The electromagnetic receiver 202 may receive the electromagnetic signal via wired or wireless communication through the example receiver antenna 110. The electromagnetic receiver 202 determines the example electric field signal 201 and the example magnetic field signal 203 from the received electromagnetic signal (block 304). As shown below, the example electric field signal 201 and the example magnetic field signal 203 are analyzed to determine RSSI values, an RSSI difference, a wavelength, and a phase difference.

At block 306, the example RSSI determiner 208 determines the RSSI value of both the example electric field signal 201 and the example magnetic field signal 203. Once the RSSI values have been calculated, the example RSSI difference determiner 210 calculates a difference between the RSSI value associated with the example electric field signal 201 and the RSSI associated with the example magnetic field signal 203 (block 308). As previously described, the RSSI difference determiner 210 may calculate the difference by subtraction the electronic RSSI value by the magnetic RSSI value or by subtracting the magnetic RSSI value by the electronic RSSI value. The electronic RSSI value, the magnetic RSSI value, and the RSSI difference are transmitted to the example weight amplifier 222 for further processing.

At block 310, the wavelength determiner 212 determines the wavelength and/or frequency of the example electric field signal 201 and/or the example magnetic field signal 203. In some examples, the wavelength determiner 308 may determine the wavelength and/or frequency by analyzing the received electric field signal 201 and/or the example magnetic field signal 203. Alternatively, the wavelength may be encoded into the electromagnetic signal. In such examples, the example wavelength determiner 212 reads the data to determine the wavelength. In some examples, the example receiver antenna 110 only receives electromagnetic signals from a single wavelength (or a single range of wavelengths). In such examples, the wavelength determiner 212 may not be needed or may always determine the same wavelength when an electromagnetic signal is received. The determined wavelength is transmitted to the example weight applier 222 for further processing.

At block 312, the example phase determiner 204 determines a phase angle for the example electric field signal 201 and a phase angle for the example magnetic field signal 203. Once the phase angles have been calculated, the example phase difference determiner 206 determines a difference between the phase angle of the example electric field signal 201 and the phase angle of the example magnetic field signal 203 (block 314). As previously described, the phase difference determiner 210 may calculate the difference by subtracting the electronic phase angle by the magnetic phase angle or by subtracting the magnetic phase angle by the electronic phase angle. The phase angle difference is transmitted to the example weight amplifier 222 for further processing.

At block 316, the example weight applier 222 determines if the example transmitter distance 114 (e.g., the distance between the transmitter 100 and the receiver 108) is less than a threshold distance. In some examples, the threshold difference is preset and/or adjustable based on user and/or manufacture preferences. In some examples, the threshold difference is based on the determined wavelength and/or frequency of the received electromagnetic signal. The example weight applier 222 gathers the electric RSSI value, the magnetic RSSI value, the RSSI difference, and the phase angle difference and approximates the transmitter distance 114 based on corresponding stored distance estimates in the example RSSI difference-to-distance storage 214, the example phase difference-to-distance storage 216, the example electronic RSSI-to-distance storage 218, and the example magnetic RSSI-to-distance storage 220. In some examples, the weight applier 222 determines that the example transmitter distance 114 is less than the threshold distance when all of the corresponding stored differences from the example storages 214-220 are close or further than a threshold distance. For example, if the stored distance estimates based on the determined RSSI values, the RSSI difference, and the phase angle difference are 1.2 m, 1.7 m, 1.1 m, and 0.3 m and the threshold difference is 2 m, then the example weight applier 222 determines that the example transmitter distance 114 is less than the threshold distance. In some examples, the distance estimates are averaged. For example, if the if the stored distances are 1.2 m, 1.7 m, 1.1 m, and 0.3 m, the example weight applier 222 would determine if the average estimate of 1.08 m (e.g., the average of the distance estimates) is less than the threshold. In some examples, the example weight applier 222 determines if the transmitter distance 114 is less than the threshold difference based on the number of stored distance estimates within the threshold distance.

If the example weight applier 222 determines that the example distance is less than the threshold distance, the weight applier 222 applies a first set of weights (block 318). If the example weight applier 222 determines that the example distance is not less than the threshold distance, the example weight applier 222 applies a second set of weights (block 320). Although the example flowchart 300 has two sets of weights (e.g., for short distances and for long distances), there may be a plurality of weights for a plurality of threshold ranges (e.g., 0-1 m, 1-5 m, 5-25 m, etc.). As previously described, in shorter distances RSSI values may be a better predictor of distance, whereas at longer distances phase angles may be a better predictor of distances. In such examples, the first set of weights (e.g., for shorter distances) may weigh RSSI values more than phase angles. Additionally, the second set of weights (e.g., for longer distances) may weigh the phase angles more than the RSSI values. In some examples, the first set of weights and the second set of weights are preset based on the wavelength and/or frequency of the received electromagnetic signal. In some examples, the first set of weights and the second set of weights are based on user and/or manufacture settings.

At block 322, the example weight applier 222 determines if there is any additional information about the example electric field signal 201 and/or the example magnetic field signal 203 that may affect the set of weights. If there is additional information, the example weight determiner 222 adjusts the weights accordingly (block 324). For example, if there is a nearby metallic object, a discrepancy between the electric field signal 201 and the magnetic field signal 203 (e.g., the electric field signal 201 signal has a different wavelength and/or amplitude than the magnetic field signal 203) may exist. In such examples, the weight applier 222 may lower the weight associated with the electric RSSI value and increase the weight associated with the magnetic RSSI value 106. In some examples, the weight applier 222 may adjust the weights based on an amount of difference between the estimated phase difference distance and the estimate RSSI difference distance. In some examples, the transmitter power may be unknown. Since transmitter power affects the electric RSSI value and the magnetic RSSI value, the example weight applier 222 may reduce the weights associated with the electric RSSI value and the magnetic RSSI value (e.g., to 0).

At block 326, the example weight applier 222 determines the transmitter distance 114 based on the set of weights and the example reporter 224 reports the transmitter distance 114. As previously described, the transmitter distance 114 is determined based on the stored distances and the determined set of weights (e.g., trans_distance=$a_1$ ($D_{\Delta RSSI}$)+$a_2$ ($D_{\Delta phase}$)+$a_3$ ($D_{elec\_RSSI}$)+$a_4$($D_{mag\_RSSI}$)). In some examples, the reporter 224 transmits a signal including the determined transmitter distance 114 to an additional device for further processing.

Figure 4:
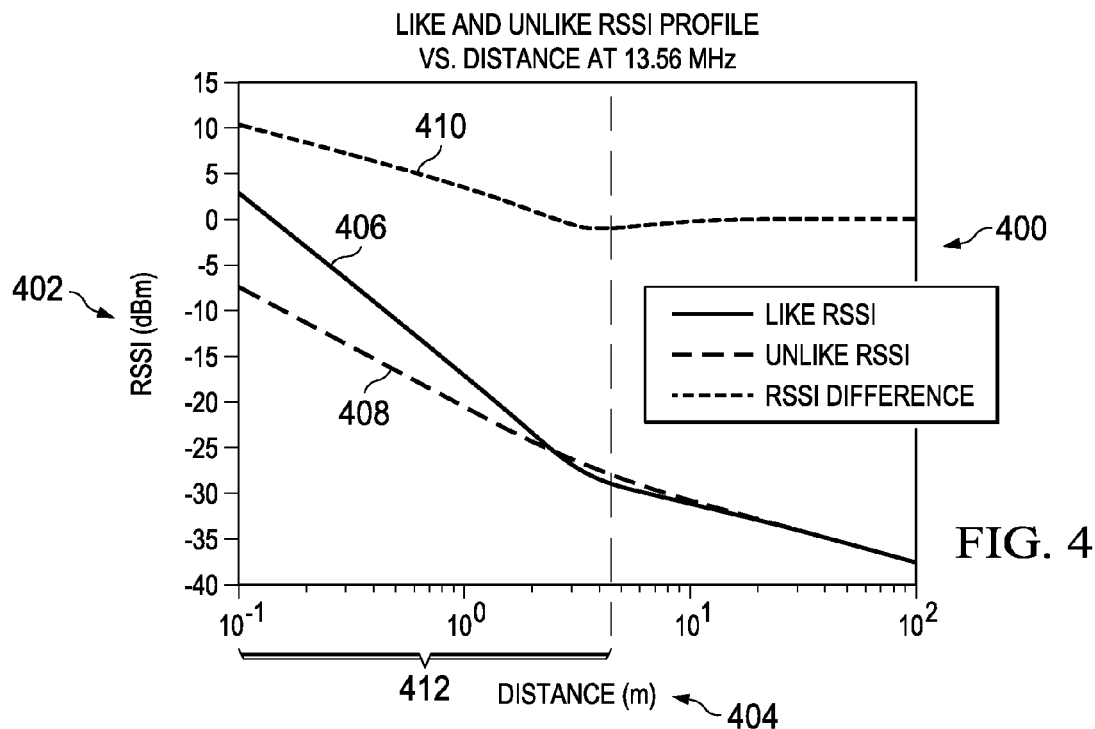
FIG. 4 is a graph illustrating example RSSI values for an electric field and a magnetic field used by the example distance determiner of FIGS. 1 and 2 to determine the example transmitter distance.

FIG. 4 is an example graph 400 is a graph of RSSI value 402 based on distance 404. The example graph 400 includes example like RSSI 406, example unlike RSSI 408, and example difference RSSI values 410 (e.g., in dBm) of an electromagnetic signal at a frequency of 13.56 MHz. As previously described, the like RSSI value 406 and the unlike RSSI 408 value may be associated with the example electric field signal 201 or the example magnetic field signal 203 depending on whether the example receiver antenna 110 is an electric antenna or a magnetic antenna. For example, if the example receiver antenna 110 is an electric antenna, then the like RSSI value 406 is associated with the electric field signal 201 and the unlike RSSI value 408 is associated with the magnetic field signal 203. If the example receiver antenna 110 is a magnetic antenna, then the like RSSI value 406 will be associated with the magnetic field signal 203 and the unlike RSSI value 408 will be associated with the electric field signal 201.

In the example graph 400 of FIG. 4, the example RSSI difference 410 is the difference between the like RSSI value 406 and the unlike RSSI value 408 at various distances 404. An example distance range 412 represents the distance range for shorter distances where the RSSI difference 410 has a sharp slope. As previously described, an estimated distance based on RSSI difference 410 is more accurate at shorter distances (e.g., less than 1.5 m). In such shorter distances, the weight associated with the RSSI difference 410 may be stronger than the weight associated with the phase angle difference, for example. As shown in the example graph 400, the RSSI difference 410 approaches zero as the distance increases since the like RSSI value 406 and the unlike RSSI 408 value become in sync.

Figure 5:
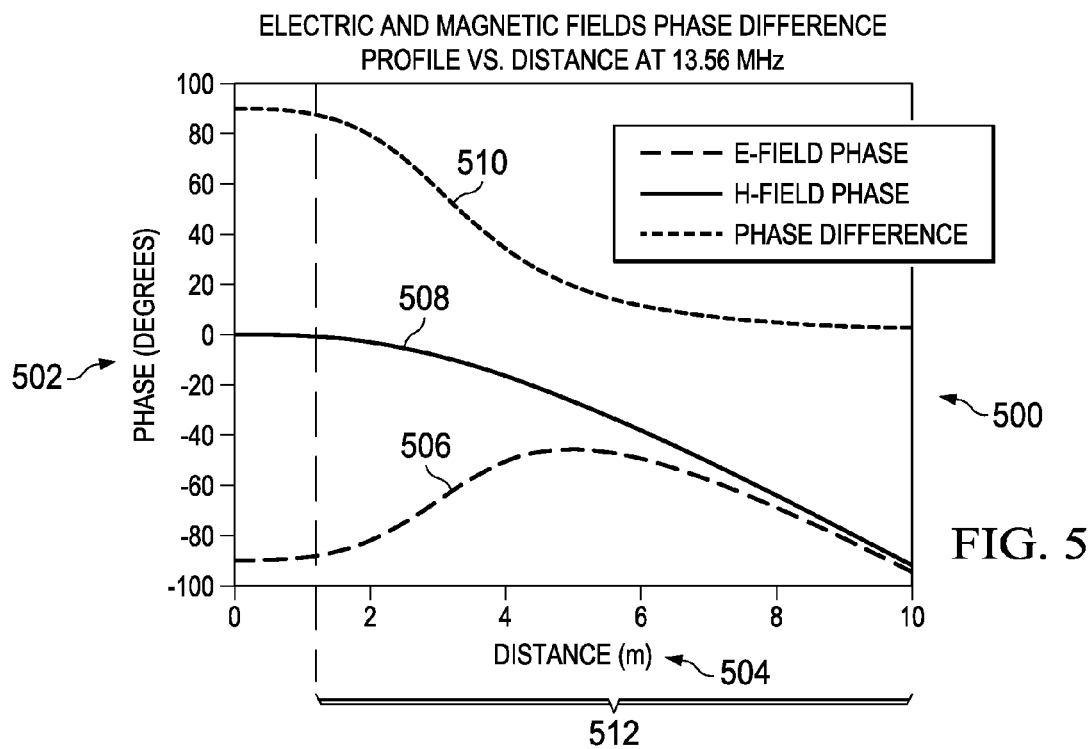
FIG. 5 is a graph illustrating example phase angle for an electric field and a magnetic field used by the example distance determiner of FIGS. 1 and 2 to determine the example transmitter distance.

FIG. 5 is an example graph 500 displays phase angles 502 at various distances 504 including an example electric field phase 506, an example magnetic field phase 508, and an example phase difference 510 of an electromagnetic signal at a frequency of 13.56 MHz. In the example graph 500, the phase difference 510 is determined by subtracting the magnetic phase 508 from the electric phase 506. Alternatively, the phase difference may be determined by subtracting the electric phase 506 from the magnetic phase 508.

Distance range 512 represents a range of distances where the phase difference 510 has sharper slope. As previously described, an estimated distance based on the phase angle difference 510 is more accurate at longer distances (e.g., greater than 1.5 m). In such longer distances, the weight associated with the phase angle difference 510 may be stronger than the weight associated with the RSSI difference 410, for example.

Figure 6:
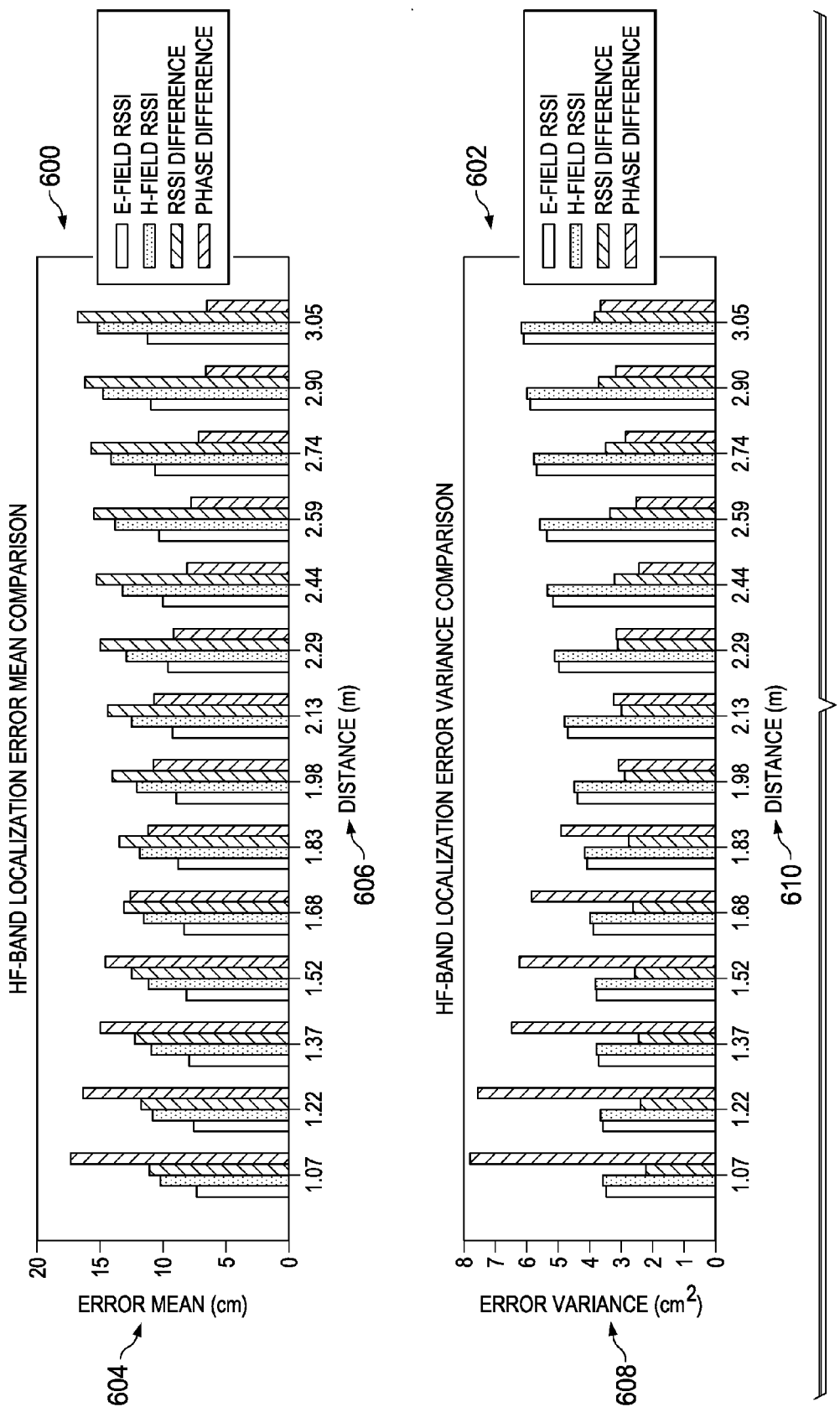
FIG. 6 is a graph illustrating an example error mean comparison and an example error variance comparison for an electric field RSSI, a magnetic field RSSI, an RSSI difference, and a phase difference.

FIG. 6 includes an electromagnetic localization error mean comparison graph 600 illustrating an example error mean 604 for various distances 606, and an electromagnetic localization error variance comparison graph 602 illustrating example error variance 608 for various distances 610. As shown in the example error mean comparison graph 600, as the example transmitter distance 114 increases, the mean error 604 associated with phase difference 510 decreases and the mean error 604 associated the RSSI values 406, 408 and the RSSI difference 410 increases. In some examples, the threshold distance for determining when to apply the first set of weights and the second set of weights may be based on when the mean error 604 associated with the RSSI difference 410 and the mean error 604 associated with the phase angle difference 510 are approximately equal.

As shown in the example error variance comparison graph 602, as the example transmitter distance 114 increases, the variance error 608 associated with phase difference 510 decreases and the variance error 608 associated the RSSI values 406, 408 and the RSSI difference 410 increases. In some examples, the threshold distance for determining when to apply the first set of weights and the second set of weights may be based on when the variance error 608 associated with the RSSI difference 410 and the variance error distance associated with the phase angle difference 510 are approximately equal.

Figure 7:
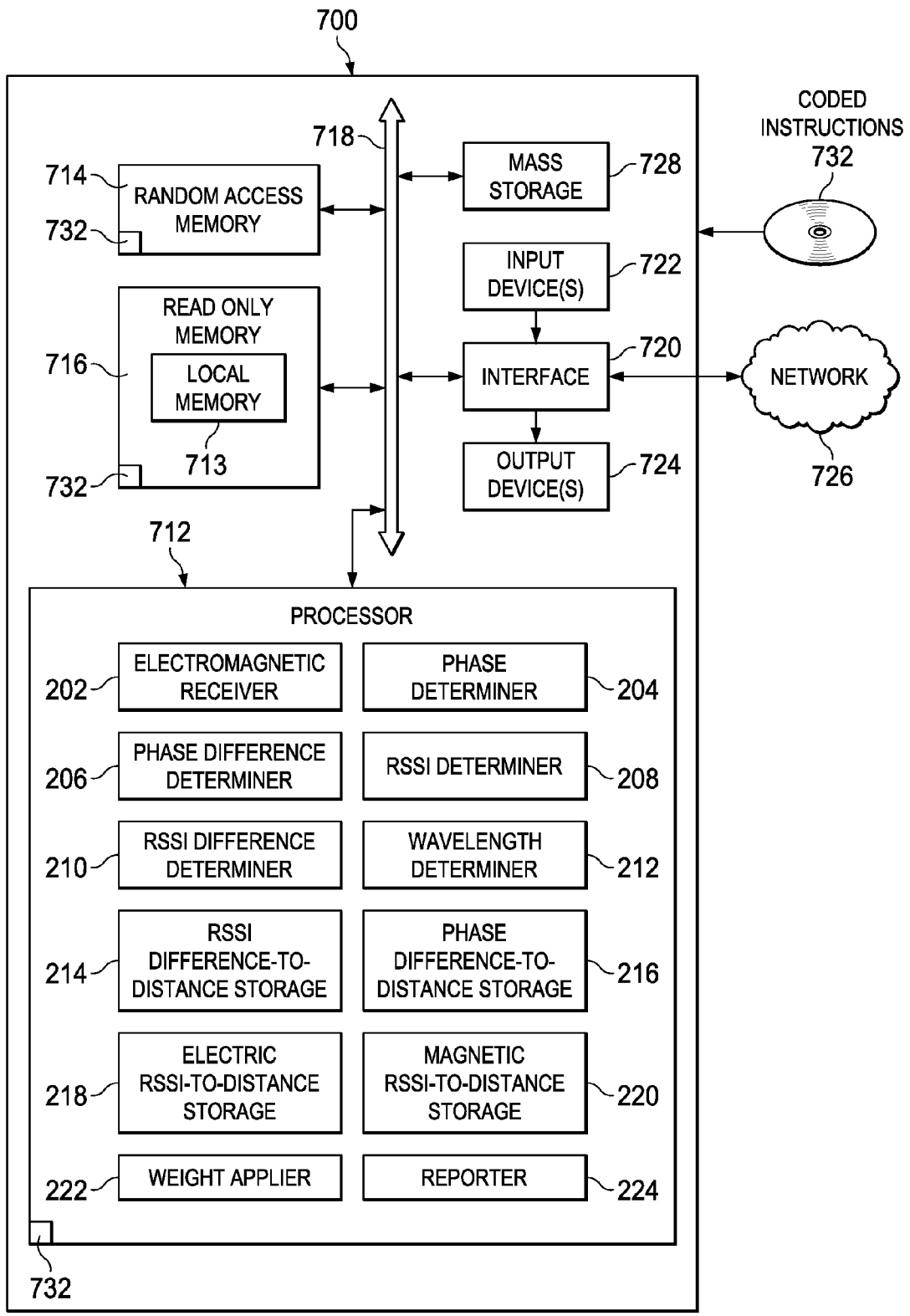
FIG. 7 is a block diagram of a processor platform structured to execute the example machine readable instructions of FIG. 3 to control the example distance determiner of FIGS. 1 and 2.

FIG. 7 is a block diagram of an example processor platform 700 capable of executing the instructions of FIG. 3 to implement the example distance determiner 112 of FIGS. 1 and 2. The processor platform 700 can be, for example, a server, a personal computer, a mobile device (e.g., a cell phone, a smart phone, a tablet such as an iPad™), a personal digital assistant (PDA), an Internet appliance, or any other type of computing device.

The processor platform 700 of the illustrated example includes a processor 712. The processor 712 of the illustrated example is hardware. For example, the processor 712 can be implemented by integrated circuits, logic circuits, microprocessors or controllers from any desired family or manufacturer.

The processor 712 of the illustrated example includes a local memory 713 (e.g., a cache). The example processor 712 of FIG. 7 executes the instructions of FIG. 3 to implement the example electromagnetic receiver 202, the example phase determiner 204, the example phase difference determiner 206, the example RSSI determining 208, the example RSSI difference determiner 210, the example wavelength determiner 212, the example RSSI difference-to-distance storage 214, the example phase difference-to-distance storage 216, the example electric RSSI-to-distance storage 218, the example magnetic RSSI-to-distance storage 220, the example weight applier 222, the example reporter 224 of FIG. 2 to implement the example distance determiner 112. The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a clock controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIG. 3 may be stored in the mass storage device 728, in the volatile memory 714, in the non-volatile memory 716, and/or on a removable tangible computer readable storage medium such as a CD or DVD.

From the foregoing, it would be appreciated that the above disclosed method, apparatus, and articles of manufacture determine a transmitter distance (e.g., a distance between a receiver and a transmitter) based on an RSSI value associated with the electric field generated by the transmitter, an RSSI value associated with the magnetic field generated by the transmitter, a difference between the electric RSSI value and the magnetic RSSI value, and a difference between a phase angle associated with the electric field and a phase angle associated with the magnetic field. Using the examples disclosed herein, overall performance may be improved by 36% in a distance error mean and 28% in a distance error variance. Additionally, since the RSSI difference and the phase difference are not affected by transmission power levels, the distance between the transmitter and the receiver can be determined without the need for additional circuitry that accounts for varying transmission powers.

Conventional techniques for determining the distance between a receiver and a transmitter only involve phase angles. Such conventional techniques lose significant accuracy and precision at shorter distances. By using a combination of data associated with RSSI values associated with the electric field and the magnetic field and data associated with phases angles associated with the electric field and the magnetic field, the receiver is able to accurately determine the distance between the transmitter and the receiver at both long and short distances.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A receiver comprising:
   a received signal strength indication (RSSI) determiner to determine a first strength of an electric field and a second strength of a magnetic field, the electric field and the magnetic field associated with an electromagnetic signal sent from a transmitter;
   an RSSI difference determiner to determine a difference between the first strength and the second strength; and
   a weight applier to determine a first estimated distance of the transmitter from the receiver based on the difference between the first strength and the second strength;
   a phase determiner to determine a first phase associated with the electric field and a second phase associated with the magnetic field; and
   a phase difference determiner to determine a difference between the first phase and the second phase, wherein the weight applier is structured to determine a second estimated distance of the transmitter from the receiver based on the difference between the first phase and the second phase;

wherein the weight applier is structured to determine a third estimated distance and a fourth estimated distance of the transmitter from the receiver based on the first strength and the second strength respectively;

wherein the weight applier is structured to determine a set of weights based on the estimated distances, the set of weights including a first weight corresponding to the first difference, a second weight corresponding to the second difference, a third weight corresponding to the first strength, and a fourth weight corresponding to the second strength.

2. The receiver of claim 1, wherein a transmitter distance is determined by summing a first product of the first weight to the first estimated distance, a second product of the second weight to the second estimated distance, a third product of the third weight to the third estimated distance, and a fourth product of the fourth weight to the fourth estimated distance.

3. The receiver of claim 2, wherein the set of weights changes based on at least one of the first estimated distance the second estimated distance the third estimated distance and the estimated fourth distance.

* * * * *